(12) United States Patent
Mellina et al.

(10) Patent No.: US 11,049,151 B2
(45) Date of Patent: Jun. 29, 2021

(54) SYSTEMS AND/OR METHODS FOR CONSTRUCTING ONLINE ADS USING MEDIA OBJECTS CREATED BY GENERATIVE PROCESSES

(71) Applicant: Oath, Inc., New York, NY (US)

(72) Inventors: Clayton Mellina, San Francisco, CA (US); Ioannis Kalantidis, San Francisco, CA (US); Tobias Baumgartner, San Francisco, CA (US)

(73) Assignee: Verizon Media Inc., New York, NY (US)

( * ) Notice: Subject to any disclaimer, the term of this patent is extended or adjusted under 35 U.S.C. 154(b) by 422 days.

(21) Appl. No.: 15/857,540

(22) Filed: Dec. 28, 2017

(65) Prior Publication Data

US 2019/0205946 A1 Jul. 4, 2019

(51) Int. Cl.
*G06Q 30/00* (2012.01)
*G06Q 30/02* (2012.01)
*G06N 20/00* (2019.01)

(52) U.S. Cl.
CPC ......... *G06Q 30/0276* (2013.01); *G06N 20/00* (2019.01); *G06Q 30/0277* (2013.01)

(58) Field of Classification Search
CPC . G06Q 30/0276; G06Q 30/0277; G06N 20/00
See application file for complete search history.

(56) References Cited

U.S. PATENT DOCUMENTS

| | | | | |
|---|---|---|---|---|
| 8,600,802 | B1* | 12/2013 | Tveit | G06Q 30/0244 705/14.1 |
| 8,849,812 | B1* | 9/2014 | Mukherjee | G06F 16/958 707/728 |
| 9,773,098 | B1* | 9/2017 | Waid | G06F 21/10 |
| 2002/0062245 | A1* | 5/2002 | Niu | G06Q 30/02 705/14.51 |
| 2005/0065806 | A1* | 3/2005 | Harik | G06Q 30/02 705/1.1 |
| 2008/0065490 | A1* | 3/2008 | Novick | G06Q 20/204 705/14.26 |
| 2008/0195957 | A1* | 8/2008 | Kim | G06Q 30/0241 715/762 |
| 2009/0028443 | A1* | 1/2009 | Chen | G06K 9/6292 382/224 |
| 2011/0078726 | A1* | 3/2011 | Rosenberg | H04N 21/25891 725/34 |
| 2012/0303466 | A1* | 11/2012 | Boskovich | G06Q 30/0241 705/14.72 |
| 2015/0127565 | A1* | 5/2015 | Chevalier | G06Q 30/00 705/319 |
| 2015/0170223 | A1* | 6/2015 | Clark | G06Q 30/0248 705/14.47 |
| 2017/0011418 | A1* | 1/2017 | Denton | G06F 3/0485 |

(Continued)

OTHER PUBLICATIONS

Sundaram; Multimedia Semantics_ Interactions Between Content and Community; IEEE 2012, pp. 2737-2758; 2012.*

(Continued)

*Primary Examiner* — Radu Andrei
(74) *Attorney, Agent, or Firm* — Cooper Legal Group, LLC (57) ABSTRACT

Embodiments of methods and/or systems for constructing one or more online ads using one or more media objects created using one or more generative processes are disclosed.

20 Claims, 4 Drawing Sheets

300

(56) References Cited

U.S. PATENT DOCUMENTS

| | | | |
|---|---|---|---|
| 2017/0300457 A1* | 10/2017 | Wigder | G06F 3/0483 |
| 2017/0323343 A1* | 11/2017 | Dey | G06Q 30/0264 |
| 2017/0358003 A1* | 12/2017 | Han | G06Q 30/0241 |
| 2018/0005274 A1* | 1/2018 | Calvillo | G06F 16/9535 |
| 2018/0082172 A1* | 3/2018 | Patel | G06N 3/0472 |
| 2018/0341986 A1* | 11/2018 | Ma | H04W 4/18 |
| 2019/0034814 A1* | 1/2019 | Amer | G06N 5/04 |
| 2019/0081975 A1* | 3/2019 | Iaroshevych | H04L 63/1425 |
| 2019/0392487 A1* | 12/2019 | Duke | G06N 20/00 |
| 2020/0118160 A1* | 4/2020 | Ferreira | G06Q 30/0244 |
| 2020/0374600 A1* | 11/2020 | Xu | G06F 17/15 |

OTHER PUBLICATIONS

Zainalabidin; Development of Display Ads Retrieval System to Match Publisher's Content; 2012; 14m pages; 2012.*

* cited by examiner

SYSTEMS AND/OR METHODS FOR CONSTRUCTING ONLINE ADS USING MEDIA OBJECTS CREATED BY GENERATIVE PROCESSES

BACKGROUND

Field

This disclosure relates to constructing one or more online ads including one or more media objects created using one or more generative processes.

Information

As the Internet continues to grow and/or evolve, improved methods and/or systems of online advertising may be advantageous. For example, greater efficiency and/or customization regarding creating and/or presenting online ads are aspects where additional improvement may be desirable.

BRIEF DESCRIPTION OF DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

Online advertising continues to evolve along with the evolution of the Internet, networked, and/or distributed applications such as, for example, networked audio and/or video applications, networked gaming and/or virtual reality environments, and/or combinations thereof. However, for ease of presentation and/or understanding, a focus herein will be online advertising that may appear on one or more websites. It should be understood, however, that this focus is solely for illustrative purposes and, thus, is not meant to limit claimed subject matter. For example, another application could be online advertising in a networked audio application.

In connection with online advertising, Web sites, for example, may serve online ads in conjunction with served Web pages. As a simple illustration, a Web site may provide autumn related advertisements in the autumn, and, likewise, for other seasons. In another example, a Web site may provide different advertisements based, at least in part, on age, location, and/or other demographic content associated with a user. To further illustrate, a user may click a link (e.g., a hyperlink) to a news or shopping Web site, for example. In response to a user's click, a computing device being actuated by the user (e.g., a client device) may transmit a request over a network (e.g., the Internet) to a server indicated by the clicked link. After receiving the request, a server may provide (e.g., serve) a Web page (e.g., to the client device) which may include one or more online advertisements. Thus, in this illustration, one or more online advertisements may be received by a requesting client device from one or more servers that may be included in a network, such as one or more servers other than the particular server that provided the item, such as a news item. Taking this non-limiting, illustration a bit further, there may be advertising servers, and/or storage servers having one or more databases and/or other items, including online ads and/or portions thereof. Of course, claimed subject matter is not intended to be limited to examples provided for purposes of illustration.

In the context of this disclosure, if a user is presented a requested Web page (e.g., via a client device), this will be referred to as a "user visit" or a "user online visit," such as to a Web page and/or Web site. Generally, as used herein, "online ad context," "ad context," "ad-contextual content," the like, and/or combinations thereof, will be used to refer to aspects, properties, features, and/or combinations thereof, in terms of signals, signal samples, and/or memory states, associated with a user online visit that includes serving of one or more online ads to a user.

In addition to other aspects of a user online visit that may include serving of one or more ads to a user, ad contextual content may comprise content related to a user, such as identification content and/or demographic content, for example, user id, age, gender, ethnicity, geographical location, education level, income bracket, profession, marital status, social networks, etc., referred to herein as "user-profile content." User-profile content may be provided by users explicitly, such as a component of registering for an online product and/or service. However, likewise, user-profile content may be collected in other ways, in other embodiments, such as, for example, by use of cookies. The foregoing, again, is meant to be illustrative and thus non-limiting.

However, other content may also be associated with a user, such as aspects of a user's online activities, referred to herein as "user-interaction content." For example, this may include viewed Web pages, clicked links, search terms, products viewed, rated, and/or purchased, emails and/or instant messages, online social groups recently visited, other aspects of user-online activity, and/or combinations thereof. For example, a user may visit a Web site for a certain amount of time, click a particular link for more content on a particular topic, about a particular product and/or to purchase an item. Thus, for example, in an embodiment, user-interaction content may be collected by an online service in the course of online user activity, such as user interaction with particular Web sites, e.g. search history, social engagement and/or combinations thereof. Of course, user interaction with online ads may be included.

It is noted, however, online advertising may present various technological challenges. For example, approaches to an online ad selection process may rely on a pool of existing (e.g., previously created) online ads from which online ad selection may take place. For example, as used herein, ad targeting and/or ad selection refers to a process of selecting an online ad from a pool of candidate online ads, to present to a user in an online ad context, for example, during a user visit to a Web page. For example, an online ad may be selected from a pool of preexisting online ads based on, at least in part, user-profile content, and/or user-interaction content. A process may be trained to estimate predictions of desirable user behavior (e.g., such as clicking a particular link and/or purchasing a product) in response to a pool of candidate online ads. These estimated predictions may be used, at least in part, to select an online ad from a pool of existing online ads to present to a user.

However, creating, designing, and/or producing a preexisting pool of online ads may consume significant human effort. Creation, design and/or production of online ads and/or online ad variants, referred to herein as "online ad design," may comprise a combination and/or collaboration of marketing design and/or media design.

Such collaborative efforts may add additional technological challenges to online advertising. For example, online ads may incorporate messaging, themes, and/or branding of an advertiser. "Marketing design," and the like, as used herein, refers to determining features of high-level messages and/or directives that a company and/or brand may wish to communicate through advertising. Also, as used herein, the phrase "high level messages and/or directives," and the like, is intended to be understood to include specific text and/or slogans, brand imagery and/or logos, and/or marketing-type qualities including intended associations, emotional impact, and/or impressions of an audience. "Media design," and the like, as used herein, refers to creating online ads, and/or portions thereof, into content from high-level messages and/or directives, the content being capable of being presented to users, and also potentially delivering intended messaging, etc. It may be desirable to create online ads that reflect high level messages and/or directives that also appeal to users, e.g., with potential to result in favorable user actions.

Approaches to media design may involve intensive efforts directed to manual creation of individual online ads and/or variants. In an example, media design may be implemented by upfront creation of a set of ads and/or ad variants that are intended to convey high level messaging and/or directives, which, through variations, may also be used to explore potential influence of various aspects thereof on desired user behavior. Thus, in one approach, after a set of ad variants is created, they may be displayed to groups and/or subgroups of users in a trial phase, with feedback and/or engagement information collected. The potential effect of different variants on users may be measured and/or estimated by analyzing feedback and/or interaction content. Online ads, estimated in terms of feedback and/or interaction content, and further according to measured and/or estimated potential effect, may be selected to be deployed in a wider ad campaign and/or used to inform creation of another set of ads employing learnings from this trial phase. However, the foregoing process, which employs substantial human involvement, may be costly and/or highly resource intensive.

It would be desirable to have a method of creating online ads that is less costly and/or less resource intensive. Improving production time may also be beneficial. Additionally, potential for improvements in the scope and/or accuracy of methods of creating and/or selecting ads to achieve particular objectives may be desirable.

Embodiments are disclosed of methods and/or systems using generative processes, subject to appeal constraints and/or communication constraints, to create non-pre-existing media objects based, at least in part, on ad-contextual content and/or based, at least in part on, pre-existing media objects. Ad-contextual content may comprise content associated with one or more user online visits to various Web sites. For example, ad-contextual content may comprise user-profile content, user-interaction content, and/or other content associated with the context of user online visits to various Web sites. In some embodiments, created media objects may be composited to construct an online ad. For example, a post-processing phase may include color-balancing one or more created media objects against a background scene, re-sizing one or more media objects, and/or positioning one or more media objects. In further embodiments, one or more media objects and/or one or more online ads may be created and/or served to a user visiting a Web site in real-time or near real-time.

Figure 1:
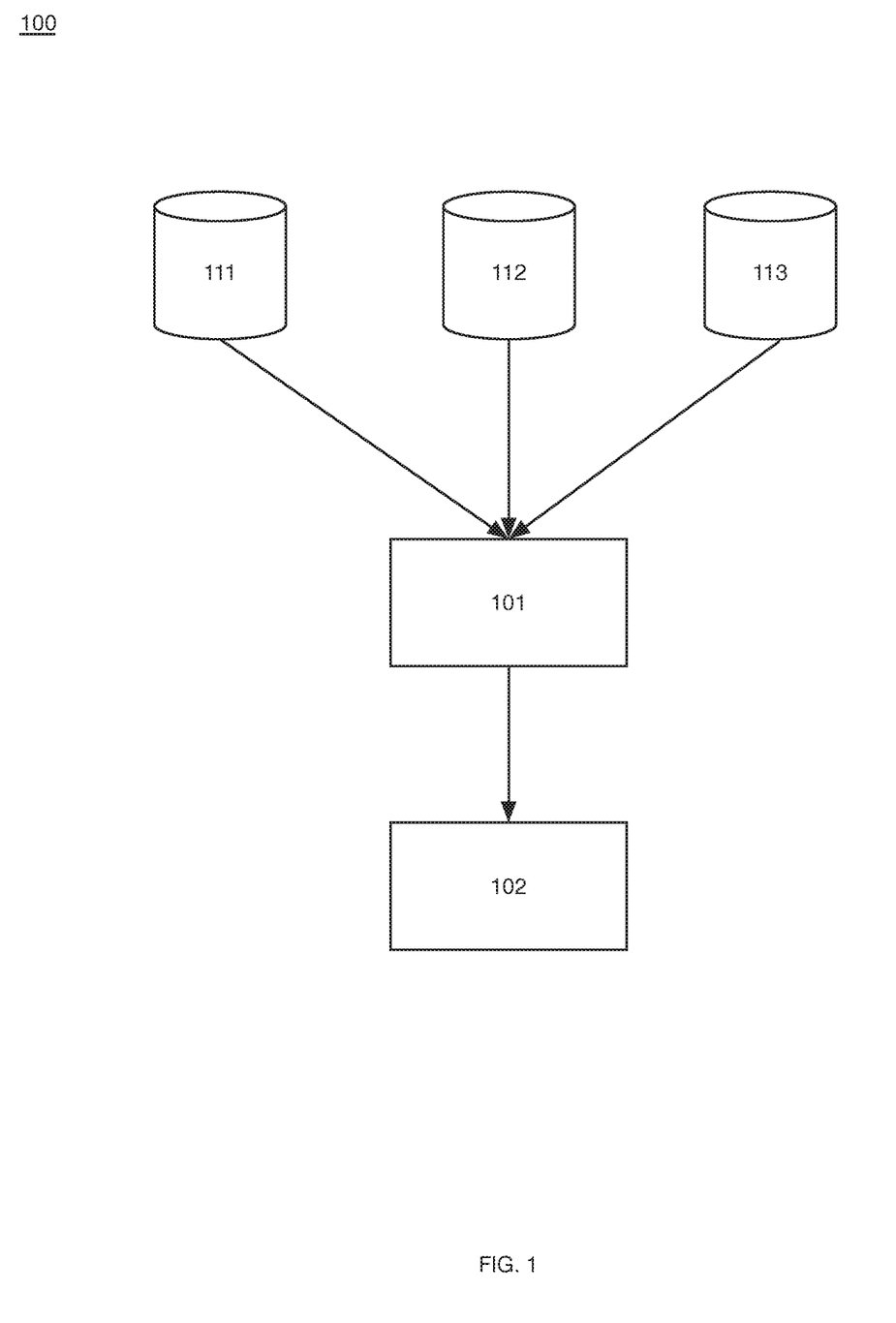
FIG. 1 is block diagram illustrating an embodiment.

FIG. 1 is a block diagram illustrating aspects of an embodiment 100 that includes a generative process 101 to create one or more media objects to be used in one or more online ads for presentation to one or more users, such as during one or more user visits to various Web pages. Generative process 101 may be trained using content from user-interaction database 111, user-profile database 112, and/or prototype media database 113 to create media objects 102, as described below. As used herein, the phrase "generative process" and the like, is used to refer to processes that are able to create one or more media objects after a training phase. For example, generative process 101 may be trained substantially in accordance with machine learning methods with respect to content from prototype media database 113, such that one or more media objects may be created that may plausibly have come from training content. In some embodiments, a metric may be used to measure plausibility, such as, for example, a loss function, as explained in more detail below. In some embodiments, a generative process may be trained to estimate a probability distribution based at least in part, on training content such as, e.g., a prototype media database. This estimated probability distribution may be sampled to create one or more media objects.

In the context of this disclosure, the term "database" will be used to broadly refer to any storage repository, whether local, networked, distributed, logical, etc. Claimed subject matter is not intended to be limited to any specific kinds and/or types of databases. Rather, the term is used to aid comprehension and/or understanding, and to obviate multiple references to various types and/or architectures of storage repositories.

In the context of generative processes and/or created media objects, as used herein, the term "real," and the like, will also be used to describe created media objects that meet the previously described criteria regarding plausibility. Generative processes may be trained on any media type, including images, audio, video, and/or text, for example, and/or combinations, like audio accompanying a video. However, for ease of presentation and/or understanding, a focus herein will be on generative processes for creating images. It should be understood, however, that this focus is solely for illustrative purposes and, thus, is not meant to limit claimed subject matter.

For example, in an embodiment, one or more media objects 102 that have been created may be placed at specified portions of a constructed online ad. Specific regions of an image may be selected for instantiation by generative process 101 while other regions may be selected to remain fixed. For example, an online ad may include a human model in an image, and a face region of the human model may be specified for image creation via generative processes. Thus, in an embodiment, generative process embodiment 101 may create pixels to be composited with other portions of an online ad, for example.

In some embodiments, generative process 101 may be trained on user-interaction content 111, in addition to prototype media content 113. In the context of this disclosure, therefore, user interaction content comprises conditioning content. Thus, a generative process may comprise a "conditional" generative process, referring to a generative process to create media objects subject to additional constraints, such as, for example, user-interaction content 111, which comprises conditioning content. For example, additional constraints may be employed to constrain media objects being created in a variety of respects. For sake of clarity, a difference between a generative process and a conditional generative process relates to content to be processed. In other words, in an embodiment, for example, a conditional generative process may modulate its created objects in a way that depends, at least in part, on additional content, here, referred to as conditioning content, provided to it for processing. In some embodiments, a conditional generative process may estimate a conditional probability distribution, based at least in part, on training content such as, e.g., a prototype media database, and based at least in part on additional content, such as, e.g., user-interaction content. For example, via sampling a conditional probability distribution estimated by training a conditional generative process as just described, a media object may be created which has features modulated by the additional content (e.g. the user-interaction content).

As an example, by training a generative process, such as embodiment 101, with respect to user-interaction content 111, in addition to content from prototype media content 113, created media objects may be made more appealing to users. Additional content, such as user-interaction content, may affect created media objects by modifying an objective function (e.g., loss function) used in training a generative process. Accordingly, with respect to the FIG. 1, conditional generative process 101 described above, may create media objects 102 that potentially may be more appealing to specific users in addition to being similar (e.g., trained using a corresponding loss function) to prototype media content 113.

More formally, in FIG. 1, an objective (e.g., formulated as an objective function (e.g., loss function)), as described below, of generative process embodiment 101 may be to produce media object 102 ("M"), given user-profile content ("U") from user-profile database 112, user-interaction content ("I") from user-interaction database 111, and prototype media objects from prototype media database 113 ("M"). Based, at least in part, on content and an objective, generative process embodiment 101, for example, may be trained to estimate a probability formulated substantially in accordance with the following: P(I+|U, M), where "I+" denotes a positive (desired) interaction of user U. This probability may be factored as:

$$P(I+|U,M)=P(I+|M')P(M'|U,M)$$

e.g., generative process embodiment 101 may create media object M' after being trained with respect to user content U and prototype media object M with an increased likelihood that a user may interact positively with created media object M'. Likewise, a generative process may be augmented by other objective functions (e.g., loss functions), e.g., to constrain created media objects M' to be of a certain structure and similar in certain respects to prototype media content. In an embodiment, created media objects, M' may comprise the same media type as prototype media, but not necessarily; for instance, image prototype content may be used to train a generative process that creates text objects.

As discussed above, user-interaction content may comprise content associated with user online visits to Web sites. For example, various user interactions may be recorded as one or more users interact with one or more Web pages, such as clicks, purchases, length of dwell time, etc. User-interaction content may also comprise content relating to online ads and/or other content presented to one or more users during one or more online visits to various Web pages. In some embodiments, user-interaction content may be collected during deployment of generative processes, as described herein, and may be used as additional training content to update and/or modify a generative process.

In an embodiment, user-interaction content may comprise logs including content with respect to aspects of user online visits, such as descriptive content, for example. Of course, this example is provided solely for purposes of illustration, and there are a variety of other ways that user-interaction content to be used as training content may be collected. Thus, claimed subject matter is not intended to be limited in this respect. Logs comprising user-profile content and/or user-interaction content may include content that may have been presented to a user during an online visit, such as online ad content, for example. Logs may also include parameters, such as with respect to images, text, video, and/or other media types, and/or other descriptive content. For example, an online ad comprising an image may be included in a log comprising pixel signal sample values and/or corresponding spatial content. Likewise, a text message that may have been presented in connection with a user visit may be identified in a log of online user visits comprising user-interaction content. For example, a log may comprise a series of characters and/or words in the form of signals, signal samples, memory states, the like, and/or combinations thereof. Of course, these examples are, again, provided solely for illustration. As further illustrative examples, video frames and/or audio samples, e.g., in the form of signals, signal samples, and/or memory states, may be included in logs potentially including parameters and/or other descriptive content with respect to video and/or audio content that may have been presented to a user during an online visit to a Web page.

As mentioned, in some embodiments, generative process 101 may be trained with respect to content beyond (e.g., in addition to) prototype media content 113. For example, generative process 101 may be trained with respect to user-interaction content 111, including online ad content. In one approach, online ad content may be used in user-interaction content 111, without further processing. For example, as noted above, an online ad comprising an image may be included in logs, as previously described. In an example approach, unprocessed pixel content may be used as training content, e.g., such as without processing, such as without characterization and/or interpretation of image content as one example. Likewise, a text portion of an online ad that may have been presented to a user, comprising a series of characters and/or words, may be used as training content without processing, such as without semantic and/or other content-related characterization, as another example. As used herein, unprocessed content may include any and/or all media types, alone and/or in any combination (e.g., images, video, audio, text etc.).

The phrase "appeal constraints," and the like, as used herein, is intended to refer to factors, criteria, parameters, and the like, and/or any combinations thereof, which relate to a likelihood that one or more created media objects and/or one or more constructed online ads may appeal to one or more users. In an embodiment, one metric for user appeal could be a value (e.g., score and/or prediction) proportional to a likelihood that an online ad, for example, may elicit favorable user behavior, such as purchasing a product, length of dwell time on a Web page and/or Web site, leaving a favorable review, the like, and/or any combination thereof. Again, these are merely illustrative examples. In embodiment 100 shown in FIG. 1, user-interaction database 111 may comprise user-ad interaction content relating to a plurality of user responses to a plurality of online ads in a plurality of ad-contexts. Moreover, as discussed above, generative process 101 may be subject to one or more appeal constraints, by training conditional generative process 101 with respect to user-interaction database 111, beyond (e.g., in addition to) prototype media content 113.

The term "communication constraints," and the like, as used herein, is intended to refer to messages, themes, branding, and/or other aspects that advertisers may wish to convey, at least in part, through advertising. Communication constraints may be implemented, as an example, via image-object related aspects, semantic content, color scheme, qualities of images of people, text, logos, and/or other brand-related elements. In an embodiment, there may also be audio and/or video elements. Of course, these are, again, merely a few illustrative examples of communication constraints and implementations thereof.

In some embodiments, one or more generative processes may be subject to communication constraints as a result of a conditional generative process which may be trained with respect to content beyond (e.g., in addition to) content with respect to a prototype media database, as discussed above with respect to example implementations of appeal constraints. For example, generative processes may be trained with respect to content, such as composition of elements comprising an online ad, semantic content (such as type of scene), color scheme, qualities of people appearing in an ad, text and/or logos appearing in an ad, and/or other brand-related elements. In other embodiments, one or more generative processes may be subject to one or more communication constraints via training with respect to particular prototype media databases, as described in more detail below.

In further embodiments, one or more generative processes may be subject to one or more communication constraints and/or one or more appeal constraints via training with a variety of potential objectives and/or constraints, e.g., such as by using a variety of potential loss functions. For example, one or more generative processes may be employed to create one or more media objects, such as for an online ad by using heuristic and/or using a user-ad interaction process, e.g., such as a machine learning process trained on user-ad interaction content. In another example, various generative processes may be used, such as with respect to a variety of ad-contextual features. Likewise, there is a range of variations in number and/or scope with respect to potential modifications determinable by a generative process of one or more media objects and/or one or more online ads, such as for different embodiments and/or different applications of a generative process. A number of satisfactory configurations are possible, and claimed subject matter is not intended to be limited in this aspect.

As discussed above, additional benefits, such as increased customization, may be realized by using generative processes to create media objects subject to one or more appeal constraints and one or more communication constraints. For example, as noted above, created media objects may be subject to one or more appeal constraints, e.g. eliciting favorable user interaction, and/or subject to one or more communication constraints, e.g. representing an advertiser's high-level messaging and/or directives.

Figure 3:
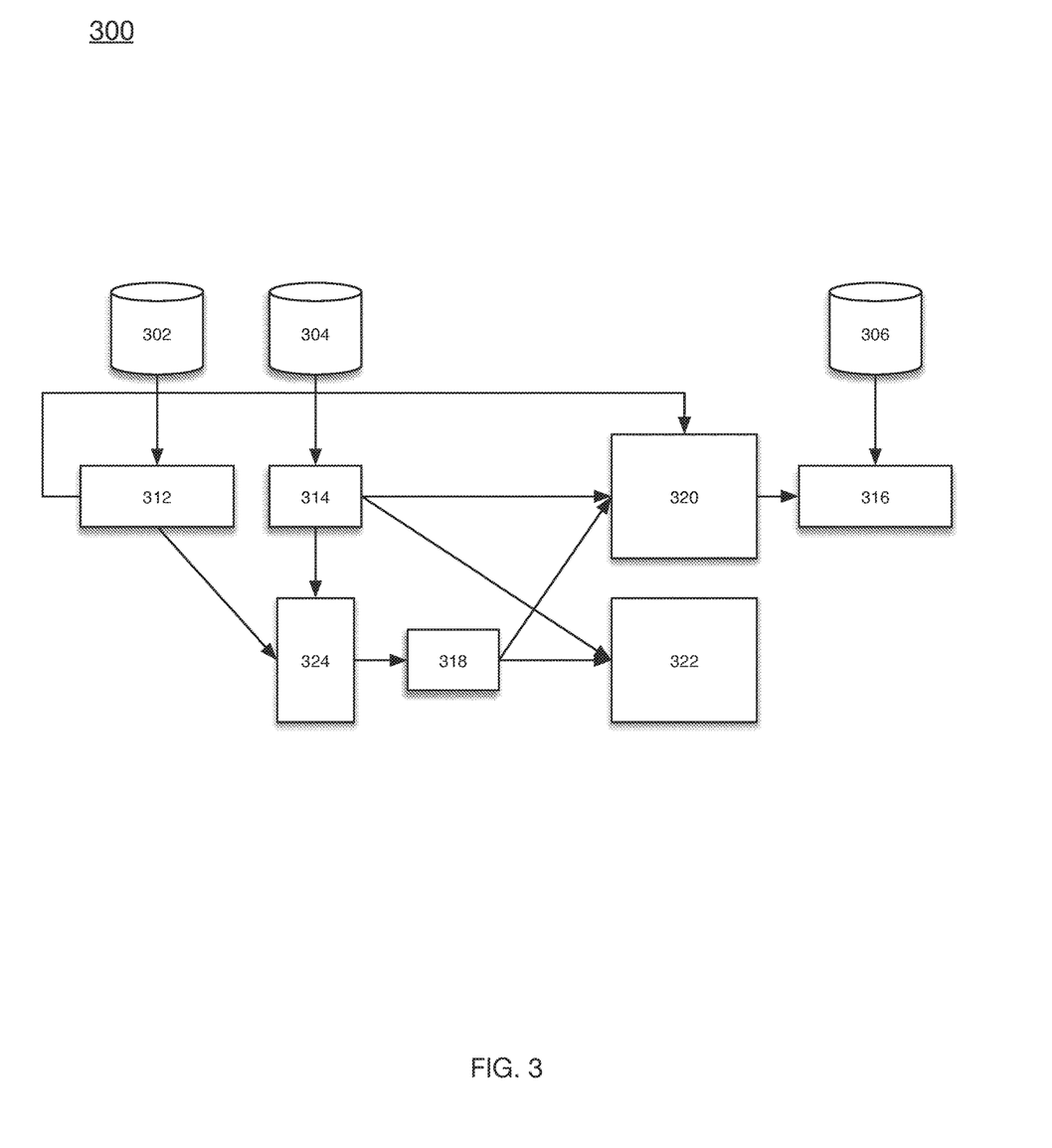
FIG. 3 is a block diagram illustrating yet another embodiment.

FIG. 3 is a block diagram depicting an embodiment 300 of a generative process implemented using a generative adversarial network. FIG. 3 shows three kinds of content databases and/or repositories, user-profile content database 302, prototype media content database 304, and user-ad interaction content database 306. Content from these databases, depicted respectively as user-profile content 312, prototype media content 314, and user-ad interaction content 316, may be made available to various processes in embodiment 300, as described below. Embodiment 300 also comprises generative process embodiment 324 which may create one or more media objects 318. In some embodiments, discriminative process embodiments 320 and 322, respectively, may also be trained in coordination with generative process embodiment 324.

Generative-adversarial networks (GANs) may comprise one approach for use in training one or more generative processes. For example, GANs may provide a training process for one or more generative processes that employs one or more discriminative processes. A GAN training procedure, in an embodiment, may train a generative process and a discriminative process in coordination. For example, a generative process may be trained to create media objects M' to be used for training a discriminative process to be able to distinguish created media objects from pre-existing media objects (e.g. media objects used to train one or more generative processes). In other words, a discriminative process may be trained to distinguish (e.g., classify) real media objects from created media objects (e.g., media objects created by one or more generative processes). Discriminative processes are machine learning type processes which, after training, may be capable of classifying and/or labeling previously unseen content. For example, discriminative processes may be trained to provide a prediction regarding classification and/or labeling based, at least in part, on training content. In some embodiments, discriminative processes may be trained to estimate predictions without necessarily estimating underlying probability distributions, in contrast to generative processes.

In an embodiment, first discriminative process embodiment 322 may be trained to evaluate one or more media objects and estimate probabilities relating to whether the one or more media objects are "real". In the context of training a discriminative process portion of a GAN, the term "real," refers to whether a media object came from pre-existing training content, whereas "not real" relates to a media object created by a generative process, such as, for example, generative process 324. Thus, during training, discriminative process embodiment 322, as an example, may be presented with one or more real media objects from prototype media content database 304 and one or more media objects created by generative process embodiment 324, to be trained to distinguish (e.g., classify) them. As shall be described, generative process embodiment 324 may be trained to create more realistic media objects, e.g., subject to a metric, based at least in part, on a loss function, as previously alluded.

For example, embodiment 300 may employ a deep neural network-type architecture. In a training phase, weights may be calculated using gradient descent, and/or back-propagation, for example, in alternating training operations for generative process embodiment 324 and discriminative process embodiment 322, respectively. For example, generative process embodiment 324 may be employed to transform a noise vector (z) into a created media object, such as: X'=G(z). To drive respective processes, in an embodiment, one or more loss functions, may be specified for generative process embodiment 324 and discriminative process embodiment 322 in which, $I_{real}$ may improve a "realness" loss so that generative process embodiment 324 is able to produce more realistic images, such as substantially in accordance with the following:

$$I_{real} = -\log D(X) - \log(1-D(G(z)))$$

In an embodiment, for example, a loss term, such as above, may be included as an objective for G and D, such as substantially in accordance with the following:

$$loss_D = I_{real}$$

$$loss_G = -I_{real}$$

Accordingly, with G and D being parameterized by weights $W_D$ and $W_G$, respectively, in an embodiment, a two-part iterative training procedure for a GAN may comprise the following:
1. Reduce $loss_D$ with respect to $W_D$
2. Reduce $loss_G$ with respect to $W_G$ Of course, there are a variety of loss functions and this is just an illustrative example, and, thus, claimed subject matter is not limited. Other examples of loss functions, for example, are described in, "Are GANs Created Equal? A Large-Scale Study", Lucic, et al., p. 3, arXiv.org: 1711.10337.

Thus, in an embodiment, one or more loss functions, used to train discriminative and/or generative processes, may be designed so that a discriminative process (e.g., one or more), such as 322, is able to better distinguish real media objects (e.g. from prototype databases comprising pre-existing content) from non-real media objects (e.g., created media objects) while a generative process, (e.g. one or more) such as 324, is better able to create media objects that are more realistic, potentially sufficiently enough so as to challenge accurate classification by a discriminative process, such as 322.

In an embodiment, generative process embodiment 324 may comprise a conditional generative process, as discussed above. For example, generative process embodiment 324 may be conditioned on user-profile content 312. For an embodiment, using generative process 324 as a conditional generative process in embodiment 300 may be implemented by incorporating conditioning content into a loss function to be used for training, such as substantially in accordance with the following:

$$I_{real} = -\log D(X,U) - \log(1-D(G(z,U),U))$$

It is worth noting that, for an embodiment, one or more media objects may be created using a noise vector to provide a source of stochasticity. For example, by using a noise vector, generative process embodiment 324 may create different media objects from a set of conditional content, such as may be for use in training.

In another embodiment, a GAN, such as embodiment 300, may include a second discriminative process, such as embodiment 320. For example, as shown in FIG. 3, in addition to first discriminative process embodiment 322, a second discriminative process embodiment 320 is shown. In an embodiment, discriminative process 320 may be trained, at least in part, with respect to user-ad interaction content database 306. For example, a machine learning approach may be used to predict a probability of a user clicking a link based at least in part on user-interaction content and/or based at least in part on online ad content, such as one or more media objects. Thus, in an embodiment, likelihood of a positive interaction by a particular user presented with a particular online ad may be appropriately scored.

In an embodiment, for example, discriminative process 322 may be trained with respect to unprocessed ad content, such content being described above. For example, portions of a visual online ad may comprise pixel signal sample values and/or corresponding spatial content. In other embodiments, various other aspects of a visual ad may be considered with respect to training content, such as, for a visual online ad, colors, etc., and for other types of online ads, keywords, audio features, video features, etc., typically corresponding to media object type.

An objective for a training phase of a generative process, such as embodiment 324, may be formulated using a trained machine learning process, such as just described. For example, in an embodiment, a generative process, such as 324, may be conditioned on user-profile content from user-profile content database 302, to create one or more media objects, such as M': M'=G(z, U). Likewise, one or more loss functions may be formulated so that generative process 324 is able to create media objects, such as M', that potentially score well with respect to a trained machine learning process, such as I. As noted above, a variety of loss functions may be used, and claimed subject matter is not limited. As an illustrative example, in an embodiment, loss term I inter may be introduced to reformulate a generator loss, such as substantially in accordance with the following:

$$I_{inter} = \log I(G(z,U),U)$$

$$\text{loss}_G = I_{real} - \lambda_{inter} I_{inter}$$

In an embodiment, for example, a hyper-parameter $\lambda_{inter}$ may be used to affect relative influence of respective terms in a loss function. The term I(G(z, U), U) in this example comprises a media interaction process (I) estimate of likelihood of positive (e.g. desirable) interaction, such as for user U with created media object G(z, U). Accordingly, in an embodiment, an appropriately formulated overall loss function may influence a generative process, such as 324, to produce more realistic media objects as well as to produce media objects that are more likely to be more appealing, such as to a user U. Thus, for example, in an embodiment, generative process 324, provided with user-profile content from a user U may create a media object that is more likely to be more appealing to user U substantially in accordance with media interaction process I.

Figure 2:
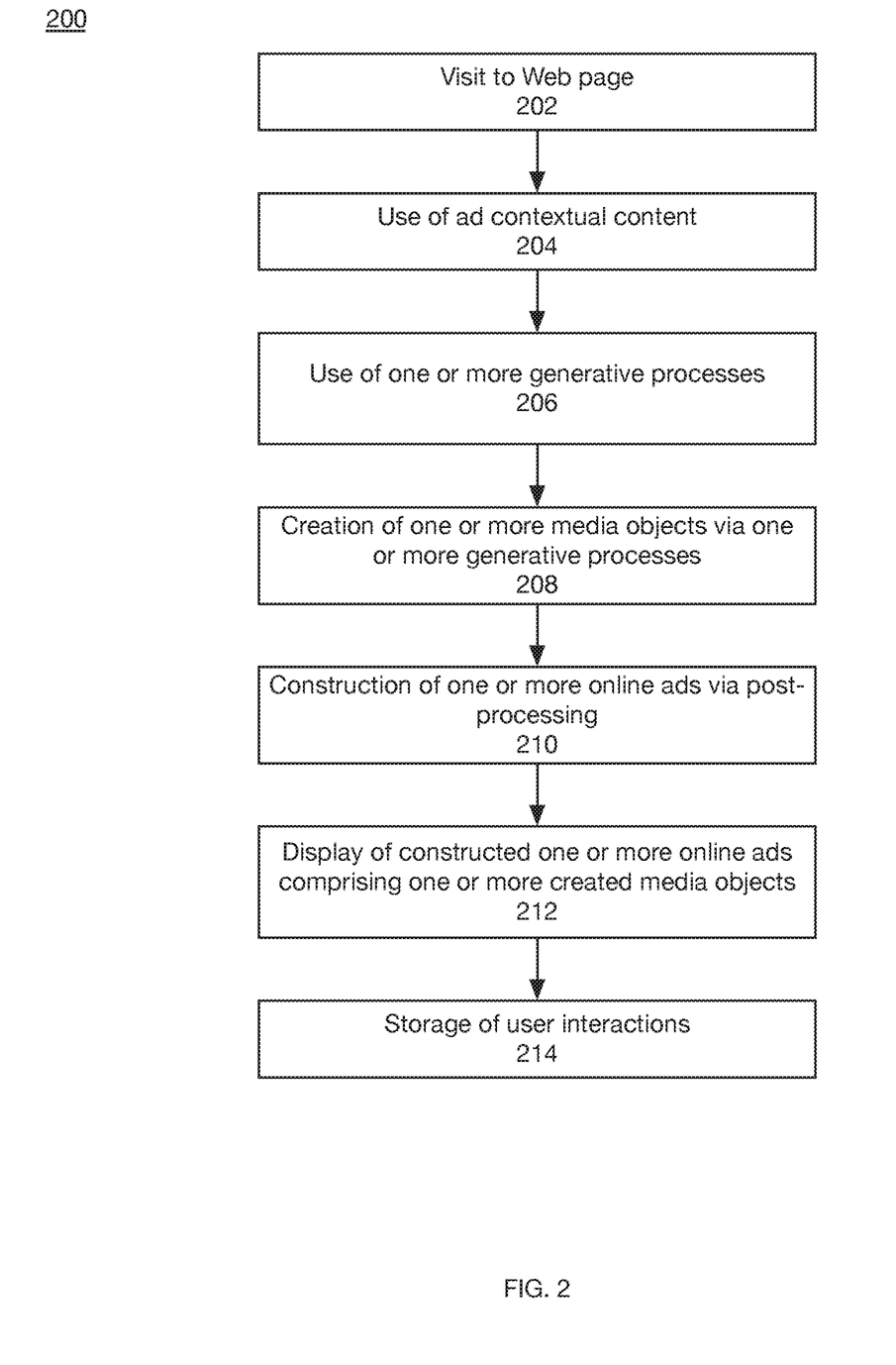
FIG. 2 is a flowchart illustrating another embodiment.

FIG. 2 shows a flow diagram of an embodiment 200 of a method for constructing one or more online ads using one or more media objects created by one or more trained generative processes. One or more operations are illustrated in FIG. 2 with respect to a certain sequence of operations that may be employed, in whole or in part. However, other sequences and/or concurrent operations may be employed in whole or in part and be within claimed subject matter. In addition, although the description below references particular aspects and/or features illustrated in certain figures, one or more operations may be performed with other aspects and/or features.

At block 202, a user visits a Web page. For example, a user may be reading an online sports article, looking up banking information, or shopping online. As discussed above, ad contextual content may comprise user-profile content, user-interaction content, and/or other aspects of online ad context.

At block 204, ad contextual content, which may comprise user-profile content and/or user-interaction content, may be employed. For example, user identification content and/or demographic content may be pushed or pulled, e.g., user id, age, gender, ethnicity, geographical location, education level, income bracket, profession, marital status, social networks, etc., for use in processing. Additionally, other ad contextual content may be employed similarly, e.g., time of day, season of year, location of a user, topic of an article, the like, and/or combinations thereof. Of course, these are meant as non-limiting illustrations.

In some embodiments, more than one generative process may be used to create one or more media objects for use in one or more online ads. For example, at block 206, multiple generative processes that may have been trained on different prototype media content may be available. Varying training content may modulate aspects of media objects created via one or more generative processes. In an embodiment, therefore, various prototype media databases may be assembled, for example, with different intended objectives. For example, a prototype media database may be used to specify semantic content. In another example, to depict friends enjoying a product together, a prototype media database may comprise a variety of images. In yet another example, a prototype media database may comprise media objects associated with a particular mood such as a collection of dark, film noir-like images, for example, to constrain a generative process to create images with similar aesthetics and/or mood.

In another embodiment, a prototype media database may be curated to exclude content of a certain type, theme, quality, etc. For example, it may be desirable for vacation related online ads to exclude images related to and/or suggesting cellphones. In an embodiment, an exclusion constraint may be employed by using an appropriately formulated loss function. Thus, for an embodiment, a trained generative process may create media objects in a manner that reduces likelihood of cellphone and/or cellphone-like related imagery being included.

Likewise, in other embodiments, one or more template ads may optionally be employed. The term "template ad," and the like, as used herein, refers to a specification regarding features of an online ad to be constructed, such as fixed and variable portions thereof, for example. Template ads may optionally include images, logos, branding and/or messaging elements. For example, a set of template ads may be created by photographing a particular scene in a handful of locations at different times with different weather, but otherwise including some content having common features among the set. Multiple generative processes and/or multiple prototype media databases, optionally in combination with one or more template ads, may be used to implement one or more communication constraints and/or one or more appeal constraints. However, template ads are only one illustrative approach to construction of an online ad via a form of specification thereof.

For example, in a template ad, a human face and a tree may be cropped from an image of a scene, with a specification indicating that these regions may be populated with created media objects. Thus, continuing with this example, a generative process for a tree may take content potentially created via a conditional process to specify season and/or location by region. Location content associated with user-profile content may likewise be used by a generative process to create a tree image intended to appear as local to where a user lives. As another example, a generative process may create an image of a smiling face intended to be appealing to users with profiles including particularly specified aspects. Thus, in some embodiments, a relationship may emerge between facial features (e.g., gender, ethnicity, age, geometric structure, etc.) appealing to various users, based at least in part on user-interaction content.

At block 208, one or more generative processes may create one or more media objects. In an example, one or more created media objects may reflect spatially-targeted objectives specified in training of a generative process. For example, a generative process may be trained to create an image of a large tree on the right side of a created media object, but may use ad-contextual content, at least in part which may affect how a tree may appear. To accomplish this, a process, such as a machine-learning process, may be pre-trained to recognize whether an image includes a tree. Likewise, a pre-trained machine learning process may be incorporated into formulation of a loss function of a generative process, in an embodiment. Here, training with respect to such a loss function may tend to increase likelihood that a created media object includes a positionally specified image of a tree. In an embodiment, a media object to be created may be relatively fixed positionally within the media object (e.g., constrained to a degree but not necessarily absolutely), and/or a generative process may determine other tree-related details, for example.

At block 210, post-processing operations may be performed to construct online ads. For example, if different portions of a media object have been created by various generative and/or other processes, color rebalancing may be beneficial. In an embodiment, post-processing may comprise compositing one or more created media objects with other media objects and/or template ads, at least partly, in accordance with one or more communication constraints and/or one or more appeal constraints, as discussed above. Thus, in an embodiment, post processing may comprise incorporating messages, themes, and/or branding, in terms of media-object related aspects, such as semantic content, color scheme, aspects, qualities, of images, of people, text, logos, and/or other brand-related elements. Likewise, in an embodiment, various types of content, such as image, text, audio, and/or video content, including combinations thereof, may be employed. Of course, these illustrative examples of post-processing are not intended to limit claimed subject matter.

To further elaborate, in some embodiments, post-processing may comprise further modifications of created media objects. For example, a generative process may provide a backdrop image while post processing may add text, logos, and/or other brand imagery to create a composited media object. Thus, media objects created by multiple generative processes may be combined; for instance, a generative process to create images may produce a backdrop image while a generative process to create text may produce textual content.

At block 212, one or more constructed online ads, comprising one or more created media objects, may be displayed. In an embodiment, an amount of time between a user visit, such as at block 202, and presentation of one or more constructed online ads, such as at block 214 may be sufficiently small on a relative basis so as to be barely perceptible, if at all, to a user. As used herein, the terms "real time," "near real-time," and the like, refer to an amount of time intended to be relatively close to barely perceptible.

At block 214, user interactions associated with presentation of one or more constructed online ads, using one or more media objects created by one or more generative processes, may be stored. For example, constructed online ad content and/or user interaction content may be stored for use as training content and/or may be incorporated more directly to modify a process for constructing one or more online ads, such as used in post-processing of created media objects. A potential benefit may result in that real-time user interaction may more readily allow modifying generative and other processes. In other embodiments, additional user-interaction content may be used for constructing different online ads and/or training other generative processes. For example, user-interaction content that associates user interaction with created tree images may be useful for creating media objects to include in other online ads.

Accordingly, an embodiment may be employed to provide an increased level of online customization and/or personalization. For example, generative processes, discriminative processes, and the like, may harness user-ad interaction content, potentially in large amounts, so as to potentially achieve cost savings, higher effectiveness, more customization, etc. For example, reducing, or even removing, direct human involvement from an online ad design phase may reduce costs by reducing or removing manual creation of individual online ads and/or variants. Instead, one or more media objects, corresponding online ads and/or variants may be produced in real-time, or near real-time, such as responsive to one or more users visiting various Web pages. In some embodiments, using unprocessed content may more accurately preserve features thereof, thus potentially enabling more flexibility in employing a variety of approaches to process training.

Further, an online ad media design phase that reduces or even omits human involvement, as described above, may potentially result in decrease of latency for a process that includes online ad design. For example, in an embodiment, one or more created media objects and/or one or more constructed online ads based, at least in part, on content with respect to user interactions may be made available in real-time or in near real-time. For example, if an ad variant (e.g., A) is performing poorly, but a different ad variant (e.g., B) is performing well, in an embodiment, a generative process may be formulated to generate more ads that are more similar to variant B than variant A. Likewise, for this example, these online ads may then constitute a candidate set with associated content collected to potentially drive subsequent improvements.

Figure 4:
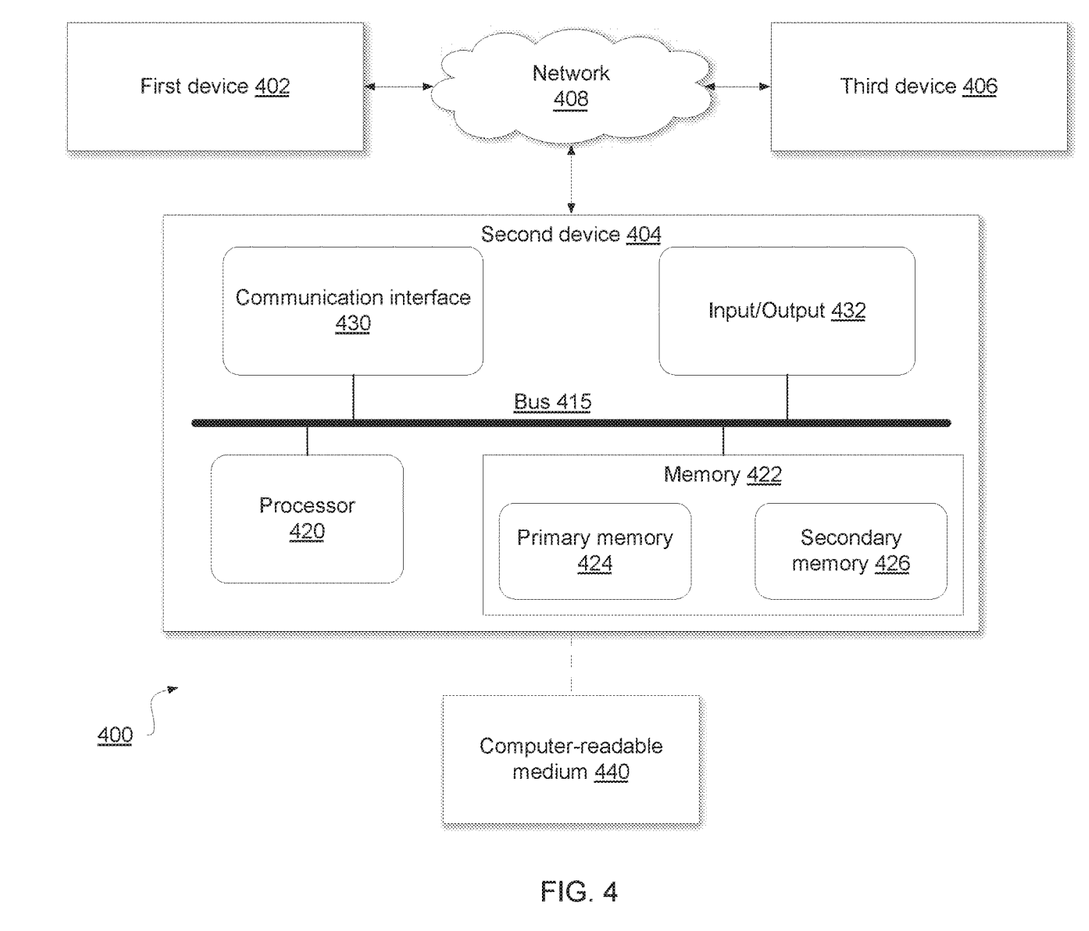
FIG. 4 is an illustration of an embodiment of a system in a networking and/or computing environment.

In one example embodiment, as shown in FIG. 4, a system embodiment may comprise a local network (e.g., device 404 and medium 440) and/or another type of network, such as a computing and/or communications network. For purposes of illustration, therefore, FIG. 4 shows an embodiment 400 of a system that may be employed to implement either type or both types of networks. Network 408 may comprise one or more network connections, links, processes, services, applications, and/or resources to facilitate and/or support communications, such as an exchange of communication signals, for example, between a computing device, such as 402, and another computing device, such as 406, which may, for example, comprise one or more client computing devices and/or one or more server computing device. By way of example, but not limitation, network 408 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 4 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present disclosure at least, this is understood to refer to sufficient structure within the meaning of 35 § USC 112 (f) so that it is specifically intended that 35 § USC 112 (f) not be implicated by use of the term "computing device" and/or similar terms; however, if it is determined, for some reason not immediately apparent, that the foregoing understanding cannot stand and that 35 § USC 112 (f) therefore, necessarily is implicated by the use of the term "computing device" and/or similar terms, then, it is intended, pursuant to that statutory section, that corresponding structure, material and/or acts for performing one or more functions be understood and be interpreted to be described at least in the foregoing paragraphs and FIG. 4 of the present disclosure.

Referring now to FIG. 4, in an embodiment, first and third devices 402 and 406 may be capable of rendering a graphical user interface (GUI) for a network device and/or a computing device, for example, so that a user-operator may engage in system use. Device 404 may potentially serve a similar function in this illustration. Likewise, in FIG. 4, computing device 402 ('first device' in figure) may interface with computing device 404 ('second device' in figure), which may, for example, also comprise features of a client computing device and/or a server computing device, in an embodiment. Processor (e.g., processing device) 420 and memory 422, which may comprise primary memory 424 and secondary memory 426, may communicate by way of a communication bus 415, for example. The term "computing device," in the context of the present disclosure, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present disclosure, may comprise hardware, software, firmware, or any combination thereof (other than software per se). Computing device 404, as depicted in FIG. 4, is merely one example, and claimed subject matter is not limited in scope to this particular example.

For one or more embodiments, a computing device may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, Flickr, and/or Google+, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 4, computing device 402 may provide one or more sources of executable computer instructions in the form physical states and/or signals (e.g., stored in memory states), for example. Computing device 402 may communicate with computing device 404 by way of a network connection, such as via network 408, for example. As previously mentioned, a connection, while physical, may not necessarily be tangible. Although computing device 404 of FIG. 4 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 422 may comprise any non-transitory storage mechanism. Memory 422 may comprise, for example, primary memory 424 and secondary memory 426, additional memory circuits, mechanisms, or combinations thereof may be used. Memory 422 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 422 may be utilized to store a program of executable computer instructions. For example, processor 420 may fetch executable instructions from memory and proceed to execute the fetched instructions. Memory 422 may also comprise a memory controller for accessing device readable-medium 440 that may carry and/or make accessible digital content, which may include code, and/or instructions, for example, executable by processor 420 and/or some other device, such as a controller, as one example, capable of executing computer instructions, for example. Under direction of processor 420, a non-transitory memory, such as memory cells storing physical states (e.g., memory states), comprising, for example, a program of executable computer instructions, may be executed by processor 420 and able to generate signals to be communicated via a network, for example, as previously described. Generated signals may also be stored in memory, also previously suggested.

Memory 422 may store electronic files and/or electronic documents, such as relating to one or more users, and may also comprise a device-readable medium that may carry and/or make accessible content, including code and/or instructions, for example, executable by processor 420 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present disclosure, and generally, is considered to be a self-consistent sequence of operations and/or similar signal processing leading to a desired result. In the context of the present disclosure, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular disclosure, as mentioned, the term "specific apparatus" therefore includes a general-purpose computing and/or network device, such as a general-purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 4, processor 420 may comprise one or more circuits, such as digital circuits, to perform at least a portion of a computing procedure and/or process. By way of example, but not limitation, processor 420 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 420 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 4 also illustrates device 404 as including a component 432 operable with input/output devices, for example, so that signals and/or states may be appropriately communicated between devices, such as device 404 and an input device and/or device 404 and an output device. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

In the context of the present disclosure, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other electrical conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, it is also used to mean that two or more tangible components and/or the like are not necessarily tangibly in direct physical contact, but are able to co-operate, liaise, and/or interact, such as, for example, by being "optically coupled." Likewise, the term "coupled" may be understood to mean indirectly connected in an appropriate context. It is further noted, in the context of the present disclosure, the term physical if used in relation to memory, such as memory components or memory states, as examples, necessarily implies that memory, such memory components and/or memory states, continuing with the example, is tangible.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second" "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be predominantly present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present disclosure merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

In the context of the present disclosure, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present disclosure that a private network may direct outgoing signal communications to devices not in the private network, but devices outside the private network may not necessarily be able to direct inbound signal communications to devices included in the private network.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this disclosure, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present disclosure, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present disclosure, push and/or pull type signal transfers are distinguished by which end of a communications path initiates signal transfer.

In the context of the particular disclosure, a network protocol, such as for communicating between devices of a network, may be characterized, at least in part, substantially in accordance with a layered description, such as the so-called Open Systems Interconnection (OSI) seven-layer type of approach and/or description. A network computing and/or communications protocol (also referred to as a network protocol) refers to a set of signaling conventions, such as for communication transmissions, for example, as may take place between and/or among devices in a network. In the context of the present disclosure, the term "between" and/or similar terms are understood to include "among" if appropriate for the particular usage and vice-versa. Likewise, in the context of the present disclosure, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, or 4G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), IEEE 802.11 (including, but not limited to, IEEE 802.11b/g/n), and/or the like. A wireless network may include virtually any type of now known and/or to be developed wireless communication mechanism and/or wireless communications protocol by which signals may be communicated between devices, between networks, within a network, and/or the like, including the foregoing, of course.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long-haul networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. The Internet and/or the Web, in the context of the present disclosure, may comprise a service that organizes stored digital content, such as, for example, text, images, video, etc., through the use of hypermedia, for example. It is noted that a network, such as the Internet and/or Web, may be employed to store electronic files and/or electronic documents.

For one or more embodiments, an electronic document and/or an electronic file may comprise a number of components. In the context of the present disclosure, a component is physical, but is not necessarily tangible. As an example, components with reference to an electronic document and/or electronic file, in one or more embodiments, may comprise text, for example, in the form of physical signals and/or physical states (e.g., capable of being physically displayed and/or maintained as a memory state in a tangible memory). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed and/or maintained as a memory state in a tangible memory). In an embodiment, digital content may comprise, for example, text, images, audio, video, haptic content and/or other types of electronic documents and/or electronic files, including portions thereof, for example.

Additionally, the term "electronic file" and/or the term "electronic document" are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

Also, in the context of the present disclosure, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth. In an embodiment, the term "parameter" may be used to refer to one or more variables that represents a quantity and/or metric, and/or one or more coefficients of such variables. As a non-limiting, illustrative example, parameters may be determined based, at least in part, on measurements of various quantities, or used to characterize the relationship between quantities and/or features of media content.

In the context of the present disclosure, the terms "entry," "electronic entry," "document," "electronic document," "content", "digital content," "item," "media object" and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present disclosure, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter is not intended to be limited to examples provided as illustrations, of course.

In the context of the present disclosure, the term "Web site" and/or similar terms refer to Web pages that are associated electronically to form a particular collection thereof. Also, in the context of the present disclosure, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example.

Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations. With advances in technology, it has become more typical to employ distributed computing and/or communication approaches in which portions of a process, such as signal processing of signal samples, for example, may be allocated among various devices, including one or more client devices, one or more server devices and/or one or more peer-to-peer devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device, a client device and/or a peer-to-peer device, as well as other types of devices, including between wired and/or wireless devices coupled via a wired and/or wireless network, for example.

In the context of the present disclosure, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in a non-transitory memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate. In an embodiment, databases may be used to store, for example, various kinds of electronic documents and content, other digital content, media objects, and the like.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

The invention claimed is:

1. A method comprising:
    employing one or more generative processes, subject to one or more appeal constraints and one or more communication constraints corresponding to at least one of a message, a theme or a brand, to create non-pre-existing media content based at least in part on ad-contextual content and based at least in part on pre-existing media object content;
    wherein the ad-contextual content used to create the non-pre-existing media content comprises user-interaction content and user profile content, wherein at least one of the user-interaction content or the user profile content is based at least in part on one or more user online visits to one or more websites.

2. The method of claim 1, wherein the non-pre-existing media content comprises one or more media objects.

3. The method of claim 2, comprising:
    constructing one or more online ads with at least one of the one or more media objects created using the one or more generative processes.

4. The method of claim 3, wherein the constructing the one or more online ads comprises post-processing at least one of the one or more media objects.

5. The method of claim 4, wherein the post-processing comprises compositing at least one of the one or more media objects using, at least in part, the one or more communication constraints.

6. The method of claim 1, wherein at least one of the one or more appeal constraints comprise one or more machine learning processes with respect to unprocessed ad content.

7. The method of claim 1, wherein at least one of the one or more communication constraints employs at least one of:
    composition,
    semantic content,
    color scheme, aspects of visual media objects of at least one of people, text, logos or brand-related aspects of media objects, or qualities of visual media objects of at least one of people, text, logos or brand-related aspects of media objects.

8. The method of claim 3, wherein the one or more online ads are constructed at least one of in real-time or near real-time.

9. The method of claim 8, comprising:
presenting the one or more online ads in at least one of real-time or near real-time.

10. The method of claim 3, wherein the constructing the one or more online ads comprises:
combining the one or more media objects with one or more template ads.

11. The method of claim 10 wherein the one or more template ads specify portions of the one or more online ads to remain fixed across one or more online ad instantiations.

12. The method of claim 1, wherein the one or more generative processes comprises one or more generative adversarial processes.

13. The method of claim 12 wherein the one or more generative adversarial processes comprises at least one of a generative process or a discriminative process.

14. The method of claim 13 wherein the discriminative process comprises a first discriminative process; and
wherein the one or more generative adversarial processes comprises:
a second discriminative process.

15. The method of claim 13 wherein the discriminative process comprises a machine learning process trained with respect to user-interaction content.

16. An apparatus comprising:
a processor; and
memory comprising instructions that when executed by the processor perform operations comprising:
employing one or more generative processes, subject to one or more appeal constraints and one or more communication constraints corresponding to at least one of a message, a theme or a brand, to create non-pre-existing media content based at least in part on ad-contextual content and based at least in part on pre-existing media object content;
wherein the ad-contextual content used to create the non-pre-existing media content comprises user-interaction content and user profile content, wherein at least one of the user-interaction content or the user profile content is based at least in part on one or more user online visits to one or more websites.

17. An article comprising:
a non-transitory computing storage medium having stored thereon instructions that when executed by a processor perform operations comprising:
employing one or more generative processes, subject to one or more appeal constraints and one or more communication constraints corresponding to at least one of a message, a theme or a brand, to create non-pre-existing media content based at least in part on ad-contextual content and based at least in part on pre-existing media object content;
wherein the ad-contextual content used to create the non-pre-existing media content comprises user-interaction content and user profile content, wherein at least one of the user-interaction content or the user profile content is based at least in part on one or more user online visits to one or more websites.

18. The article of claim 17 wherein the one or more communication constraints correspond to the message.

19. The article of claim 17 wherein the one or more communication constraints correspond to the theme.

20. The article of claim 17 wherein the one or more communication constraints correspond to the brand.

* * * * *